United States Patent
Georgiev et al.

(10) Patent No.: US 10,003,757 B2
(45) Date of Patent: Jun. 19, 2018

(54) METHOD AND APPARATUS FOR DE-NOISING DATA FROM A DISTANCE SENSING CAMERA

(71) Applicant: Nokia Technologies Oy, Espoo (FI)

(72) Inventors: Mihail Georgiev, Tampere (FI); Atanas Gotchev, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 349 days.

(21) Appl. No.: 14/655,618

(22) PCT Filed: Dec. 28, 2012

(86) PCT No.: PCT/FI2012/051304
§ 371 (c)(1),
(2) Date: Jun. 25, 2015

(87) PCT Pub. No.: WO2014/102442
PCT Pub. Date: Jul. 3, 2014

(65) Prior Publication Data
US 2015/0334318 A1    Nov. 19, 2015

(51) Int. Cl.
*G01S 17/36* (2006.01)
*H04N 5/357* (2011.01)
(Continued)

(52) U.S. Cl.
CPC ............ *H04N 5/357* (2013.01); *G01S 7/493* (2013.01); *G01S 17/36* (2013.01); *G01S 17/89* (2013.01);
(Continued)

(58) Field of Classification Search
None
See application file for complete search history.

(56) References Cited

U.S. PATENT DOCUMENTS

| 5,311,271 A | * | 5/1994 | Hurt | G01C 15/02 342/118 |
| 5,841,522 A | * | 11/1998 | Dillon | G01S 7/493 342/194 |

(Continued)

FOREIGN PATENT DOCUMENTS

| CN | 102520574 A |   | 6/2012 |
| CN | 106603942 A | * | 4/2017 |

(Continued)

OTHER PUBLICATIONS

Final Office action received for corresponding Japanese Patent Application No. 2015-550122, dated May 9, 2017, 2 pages of office action and 3 pages of office action translation available.
(Continued)

*Primary Examiner* — Charlie Y Peng
(74) *Attorney, Agent, or Firm* — Alston & Bird LLP (57) ABSTRACT

It is inter alia disclosed to determine a phase difference between a light signal transmitted by a time of flight camera system and a reflected light signal received by at least one pixel sensor of an array of pixel sensors in an image sensor of the time of flight camera system, wherein the reflected light signal received by the at least one pixel sensor is reflected from an object illuminated by the transmitted light signal (301); determine an amplitude of the reflected light signal received by the at least one pixel sensor (301); combine the amplitude and phase difference for the at least one pixel sensor into a combined signal parameter for the at least one pixel sensor (307); and de-noise the combined signal parameter for the at least one pixel sensor by filtering with a filter the combined parameter for the at least one pixel sensor (309).

18 Claims, 4 Drawing Sheets

(51) Int. Cl.

| | |
|---|---|
| H04N 13/02 | (2006.01) |
| H04N 5/225 | (2006.01) |
| G06T 5/00 | (2006.01) |
| G06T 5/20 | (2006.01) |
| G01S 17/89 | (2006.01) |
| G01S 7/493 | (2006.01) |

(52) U.S. Cl.
CPC ............... *G06T 5/002* (2013.01); *G06T 5/20* (2013.01); *H04N 5/2256* (2013.01); *H04N 13/0203* (2013.01); *G06T 2207/10028* (2013.01)

(56) References Cited

U.S. PATENT DOCUMENTS

| | | | |
|---|---|---|---|
| 7,994,465 B1* | 8/2011 | Bamji | G01S 7/4816 250/214 R |
| 2009/0190007 A1 | 7/2009 | Oggier et al. | |
| 2010/0022869 A1* | 1/2010 | Kimura | G01R 33/5615 600/419 |
| 2010/0046802 A1 | 2/2010 | Watanabe et al. | |
| 2012/0082346 A1 | 4/2012 | Katz et al. | |
| 2012/0121162 A1 | 5/2012 | Kim et al. | |
| 2012/0134598 A1 | 5/2012 | Ovsiannikov et al. | |
| 2014/0375851 A1* | 12/2014 | Lee | H04N 5/335 348/294 |
| 2016/0086318 A1* | 3/2016 | Hannuksela | G06T 5/002 348/43 |

FOREIGN PATENT DOCUMENTS

| | | |
|---|---|---|
| EP | 2073035 | 6/2009 |
| JP | 2006-153773 A | 6/2006 |
| JP | 2009-037622 A | 2/2009 |
| JP | 2009-258006 A | 11/2009 |
| JP | 2011-507429 A | 3/2011 |
| JP | 2011-508334 A | 3/2011 |
| WO | 2009/081410 A2 | 7/2009 |
| WO | 2012/014077 A3 | 2/2012 |

OTHER PUBLICATIONS

International Search Report and Written Opinion received for corresponding Patent Cooperation Treaty Application No. PCT/FI2012/051304, dated Oct. 3, 2013, 13 pages.
Park J. et al. "High quality depth map upsampling for 3D-TOF cameras". 2011 IEEE International Conference on Computer Vision, ICCV, Jun. 11, 2011, Conf. Proc pp. 1623-1630.
Dabov et al., "BM3D Image Denoising With Shape-Adaptive Principal Component Analysis", Proc. Workshop on Signal Processing With Adaptive Sparse Structured Representations (SPARS), 2009, 6 pages.
Buades et al., "A Non-Local Algorithm for Image Denoising", Proceedings of the 2005 IEEE Computer Society Conference on Computer Vision and Pattern Recognition (CVPR), vol. 2, Jun. 20-25, 2005, 6 pages.
Chan, "Noise Vs Feature: Probabilistic Denoising of Time-Of-Flight Range Data", CS 229 Machine Learning Final Projects, 2008, 5 pages.
Chan et al., "A Noise-Aware Filter for Real-Time Depth Upsampling", Workshop on Multi-camera and Multi-modal Sensor Fusion, 2008, pp. 1-12.
Dabov, "Image and Video Restoration With NonlocalTransform-Domain Filtering", Thesis, 2010, 182 pages.
Edeler et al., "Time of Flight Depth Image Denoising Using Prior Noise Information", IEEE 10th International Conference on Signal Processing Proceedings, Oct. 24-28, 2010, pp. 119-122.
FOI, "Pointwise Shape-Adaptive DCT Image Filtering and Signal-Dependent Noise Estimation", Thesis, 2007, 212 pages.
Frank et al., "Denoising of Continuous-Wave Time-Of-Flight Depth Images Using Confidence Measures", Journal of Optical Engineering, vol. 48, No. 7, 2009, 24 pages.
Gao et al., "PMD Camera Calibration Based on Adaptive Bilateral Filter", Symposium on Photonics and Optoelectronics, May 16-18, 2011, 4 pages.
Huhle et al., "Fusion of Range and Color Images for Denoising and Resolution Enhancement With a Non-Local Filter", JournalComputer Vision and Image Understanding, vol. 114, No. 12, Dec. 2010, pp. 1336-1345.
Kober et al., "Space-Variant Restoration With Sliding Discrete Cosine Transform", Proceedings of the 12th international conference on Computer analysis of images and patterns, 2007, pp. 903-911.
Lange, "3D Time-of-Flight Distance Measurement With Custom Solid-State Image Sensors in CMOS/CCD-Technology", Thesis, Jun. 28, 2000, 223 pages.
"Mesa Imaging AG", Heptagon, Retrieved on Aug. 23, 2016, Webpage available at : http://www.mesa-imaging.ch.
Moller et al., "Robust 3D Measurement WithPMD Sensors", In Proceedings of the 1st Range Imaging Research Day at ETH, Sep. 8-9, 2005, 14 pages.
"PMD Technololgies GmbH", PMD technologies, Retrieved on Aug. 23, 2016, Webpage available at : http://pmdtec.com.
"Patent Portfolio List for PMD ranging device technology", PMD Technologies, Retrieved on Aug. 30, 2016, Webpage available at : http://www.pmdtec.com/technology/patents/.
"CamCube 3.0, Technical Specification", PMD Technologies, Retrieved on Aug. 30, 2016, Webpage available at : http://www.pmdtec.com/fileadmin/pmdtec/downloads/documentation/datenblatt_camcube3.pdf.
"PMDVision CamBoard Nano, Technical Specification", PMD Technologies, Retrieved on Aug. 30, 2016, Webpage available at : http://www.pmdtec.com/fileadmin/pmdtec/media/PMDvision-CamBoard-nano.pdf.
Schairer et al., "Parallel Non-Local Denoising of Depth Maps", In International Workshop on Local and Non-Local Approximation in Image Processing (EUSIPCO Satellite Event), 2008, 7 pages.
"SwissRanger™ SR4000, Technical Specification", Retrieved on Aug. 30, 2016, Webpage available at : http://www.mesa-imaging.ch/dlm.php?fname=pdf/SR4000_Data_Sheet.pdf.
Tomasi et al., "Bilateral Filtering for Gray and Color Images", Proceedings of the Sixth International Conference on Computer Vision, Jan. 4-7, 1998, 8 pages.
Extended European Search Report received for corresponding European Patent Application No. 12890686.4, dated Jul. 12, 2016, 8 pages.
Huhle et al., "Robust Non-Local Denoising of Colored Depth Data", IEEE Computer Society Conference on Computer Vision and Pattern Recognition Workshops, Jun. 23-28, 2008, 7 pages.
Lenzen et al., "Denoising Time-Of-Flight Data With Adaptive Total Variation", Proceedings of the 7th International Symposium (ISVC), vol. 6938, 2011, pp. 337-346.
Office action received for corresponding Chinese Patent Application No. 201280078236.6, dated Jul. 15, 2016, 8 pages of office action and no pages of office action translation available.
Office action received for corresponding Chinese Patent Application No. 201280078236.6, dated Mar. 8, 2017, 6 pages of office action and no pages of translation available.
Office action received for corresponding Japanese Patent Application No. 2015-550122, dated Sep. 6, 2016, 3 pages of office action and 7 pages of office action translation available.
Office action received for corresponding Chinese Patent Application No. 201280078236.6, dated Aug. 30, 2017, 7 pages of office action and no pages of translation available.
Office Action for Chinese Application No. 201280078236.6 dated Apr. 17, 2018, 6 pages.

\* cited by examiner

METHOD AND APPARATUS FOR DE-NOISING DATA FROM A DISTANCE SENSING CAMERA

RELATED APPLICATION

This application was originally filed as PCT Application No. PCT/FI2012/051304 filed Dec. 28, 2012.

FIELD OF THE APPLICATION

The present application relates to time-of-flight camera systems, and in particular the reduction of noise in the distance images from said time of flight camera systems.

BACKGROUND OF THE APPLICATION

Time-of-flight (ToF) cameras can sense distance or range to an object by emitting a pulse of modulated light signal and then measuring the time differential in the returning wave front.

A ToF camera can comprise a light source such as a bank of light emitting diodes (LED) whereby a continuously modulated harmonic light signal can be emitted. The distance or range of an object from the light source can be determined by measuring the shift in phase (or difference in time) between the emitted and the reflected photons of light. The reflected photons can be sensed by the camera by the means of charge coupled device or the like.

The phase shift (or phase delay) between the emitted and reflected photons is not measured directly. Instead a ToF camera system may adopt a pixel structure whereby the correlation between the received optical signal and an electrical reference source is performed in order to determine a measure of the phase delay.

The resulting distance (or range) map can represent the distance to objects as the relative intensity of pixels within the distance map image.

However, the distance map image can be corrupted with the effect of noise, whether it is random noise as a result of thermal noise in the charge coupled device or noise as a result of systematic errors in the measurement of the distance to the observed object. In particular the operational performance of a ToF camera system can be influenced by internal factors resulting from the operational mode of the camera and external factors caused by characteristics of the sensed scene and sensing environment.

For example, internal factors which can limit the capabilities of a ToF camera system may include the physical limitations of the sensors used such as inherent noise and resolution. Other internal factors which can limit the capability of a ToF camera system can include the power of the emitted signal, and the integration time for forming the reflected signal samples.

External factors which may limit the performance of a ToF camera system may include the angle of incidence of the illuminating light onto sensed object, the light reflectivity of colours and materials of the sensed objects, the sensing range of the ToF camera system, and the returned light signal being formed by multiple reflections.

These factors can seriously impact on the precision of distance (or range measurements and operational efficiency of a ToF camera system. In particular for low-power ToF system devices the effect of noise can limit the distance sensing capability.

SUMMARY OF SOME EMBODIMENTS

The following embodiments aim to address the above problem.

There is provided according to an aspect of the application a method comprising: determining a phase difference between a light signal transmitted by a time of flight camera system and a reflected light signal received by at least one pixel sensor of an array of pixel sensors in an image sensor of the time of flight camera system, wherein the reflected light signal received by the at least one pixel sensor is reflected from an object illuminated by the transmitted light signal; determining an amplitude of the reflected light signal received by the at least one pixel sensor; combining the amplitude and phase difference for the at least one pixel sensor into a combined signal parameter for the at least one pixel sensor; and de-noising the combined signal parameter for the at least one pixel sensor by filtering the combined parameter for the at least one pixel sensor.

The method may further comprise at least one of: de-noising the phase difference for the at least one pixel sensor by filtering the phase difference for the at least one pixel sensor, wherein the de-noising of the phase difference may occur prior to combining the amplitude and phase difference; and de-noising the amplitude for the at least one pixel sensor by filtering the amplitude for the at least one pixel sensor, wherein the de-noising of the amplitude may occur prior to combining the amplitude and phase difference.

The filtering may further comprise filtering with a non-local spatial transform filter.

The non-local spatial transform filter can be a non-local means filter.

The method may further comprise calculating the distance range to the object from the de-noised combined signal parameter for the at least one pixel sensor by: determining the de-noised phase difference for the at least one pixel sensor from the de-noised combined signal parameter for the at least one pixel sensor; and calculating the distance range to the object for the at least one pixel sensor using the de-noised phase difference for the at least one pixel sensor.

The combined signal parameter may be a complex signal parameter formed from combining the amplitude and phase difference for the at least one pixel sensor.

The image sensor of the time of flight camera system may be based at least in part on a photonic mixer device.

According to a further aspect of the application there is provided an apparatus configured to: determine a phase difference between a light signal transmitted by a time of flight camera system and a reflected light signal received by at least one pixel sensor of an array of pixel sensors in an image sensor of the time of flight camera system, wherein the reflected light signal received by the at least one pixel sensor is reflected from an object illuminated by the transmitted light signal; determine an amplitude of the reflected light signal received by the at least one pixel sensor; combine the amplitude and phase difference for the at least one pixel sensor into a combined signal parameter for the at least one pixel sensor; and de-noise the combined signal parameter for the at least one pixel sensor by filtering the combined parameter for the at least one pixel sensor.

The apparatus may be further configured to at least one of: de-noise the phase difference for the at least one pixel sensor filtering the phase difference for the at least one pixel sensor, wherein the apparatus may be configured to de-noise the phase difference prior to combining the amplitude and phase difference; and de-noise the amplitude for the at least one pixel sensor by filtering the amplitude for the at least one pixel sensor, wherein the apparatus may be configured to de-noise the amplitude prior to combining the amplitude and phase difference.

The filtering may comprise filtering with a non-local spatial transform type filter.

The non-local spatial transform type filter can be a non-local means filter.

The apparatus maybe further configured to calculate the distance range to the object from the de-noised combined signal parameter for the at least one pixel sensor by: determining the de-noised phase difference for the at least one pixel sensor from the de-noised combined signal parameter for the at least one pixel sensor, and calculating the distance range to the object for the at least one pixel sensor using the de-noised phase difference for the at least one pixel sensor.

The combined signal parameter may be a complex signal parameter formed from combining the amplitude and phase difference for the at least one pixel sensor.

The image sensor of the time of flight camera system may be based at least in part on a photonic mixer device.

According to another aspect of the application there is provided an apparatus comprising at least one processor and at least one memory including computer code for one or more programs, the at least one memory and the computer code configured with the at least one processor to cause the apparatus at least to: determine a phase difference between a light signal transmitted by a time of flight camera system and a reflected light signal received by at least one pixel sensor of an array of pixel sensors in an image sensor of the time of flight camera system, wherein the reflected light signal received by the at least one pixel sensor is reflected from an object illuminated by the transmitted light signal; determine an amplitude of the reflected light signal received by the at least one pixel sensor; combine the amplitude and phase difference for the at least one pixel sensor into a combined signal parameter for the at least one pixel sensor; and de-noise the combined signal parameter for the at least one pixel sensor by filtering the combined parameter for the at least one pixel sensor.

The at least one memory and the computer code configured with the at least one processor may be further configured to at least one of: de-noise the phase difference for the at least one pixel sensor by filtering the phase difference for the at least one pixel sensor, wherein the at least one memory and the computer code may also be configured with the at least one processor to de-noise the phase difference prior to combining the amplitude and phase difference; and de-noise the amplitude for the at least one pixel sensor by filtering the amplitude for the at least one pixel sensor, wherein the at least one memory and the computer code may also be configured with the at least one processor to de-noise the amplitude prior to combining the amplitude and phase difference.

The filtering may comprise filtering with a non-local spatial transform type filter.

The non-local spatial transform filter can be a non-local means filter.

The at least one memory and the computer code configured with the at least one processor may be further configured to calculate the distance range to the object from the de-noised combined signal parameter for the at least one pixel sensor by: determining the de-noised phase difference for the at least one pixel sensor from the de-noised combined signal parameter for the at least one pixel sensor, and calculating the distance range to the object for the at least one pixel sensor using the de-noised phase difference for the at least one pixel sensor. The combined signal parameter may be a complex signal parameter formed from combining the amplitude and phase difference for the at least one pixel sensor.

The image sensor of the time of flight camera system may be based at least in part on a photonic mixer device.

According to another aspect of the application there is provided a computer program code when executed by a processor realises: determining a phase difference between a light signal transmitted by a time of flight camera system and a reflected light signal received by at least one pixel sensor of an array of pixel sensors in an image sensor of the time of flight camera system, wherein the reflected light signal received by the at least one pixel sensor is reflected from an object illuminated by the transmitted light signal; determining an amplitude of the reflected light signal received by the at least one pixel sensor; combining the amplitude and phase difference for the at least one pixel sensor into a combined signal parameter for the at least one pixel sensor; and de-noising the combined signal parameter for the at least one pixel sensor by filtering the combined parameter for the at least one pixel sensor.

The computer program code when executed by the processor may further realises at least one of: de-noising the phase difference for the at least one pixel sensor by filtering the phase difference for the at least one pixel sensor, wherein the de-noising of the phase difference may occur prior to combining the amplitude and phase difference; and de-noising the amplitude for the at least one pixel sensor by filtering the amplitude for the at least one pixel sensor, wherein the de-noising of the amplitude may occur prior to combining the amplitude and phase difference.

The computer program code when executed by the processor realises filtering, the computer program code may further realise filtering with a non-local spatial transform filter.

The non-local spatial transform filter can be a non-local means filter.

The computer program code when executed by the processor may further realises calculating the distance range to the object from the de-noised combined signal parameter for the at least one pixel sensor by: determining the de-noised phase difference for the at least one pixel sensor from the de-noised combined signal parameter for the at least one pixel sensor; and calculating the distance range to the object for the at least one pixel sensor using the de-noised phase difference for the at least one pixel sensor.

The combined signal parameter may be a complex signal parameter formed from combining the amplitude and phase difference for the at least one pixel sensor.

The image sensor of the time of flight camera system may be based at least in part on a photonic mixer device.

BRIEF DESCRIPTION OF DRAWINGS

For better understanding of the present invention, reference will now be made by way of example to the accompanying drawings in which.

DESCRIPTION OF SOME EMBODIMENTS OF THE APPLICATION

The following describes in more detail possible ToF camera systems with the provision for de-noising the distance (or range) map. In this regard reference is first made to FIG. 1 which shows a schematic block diagram of an exemplary electronic device or apparatus 10, which may incorporate a ToF camera system according to embodiments of the application.

Figure 1:
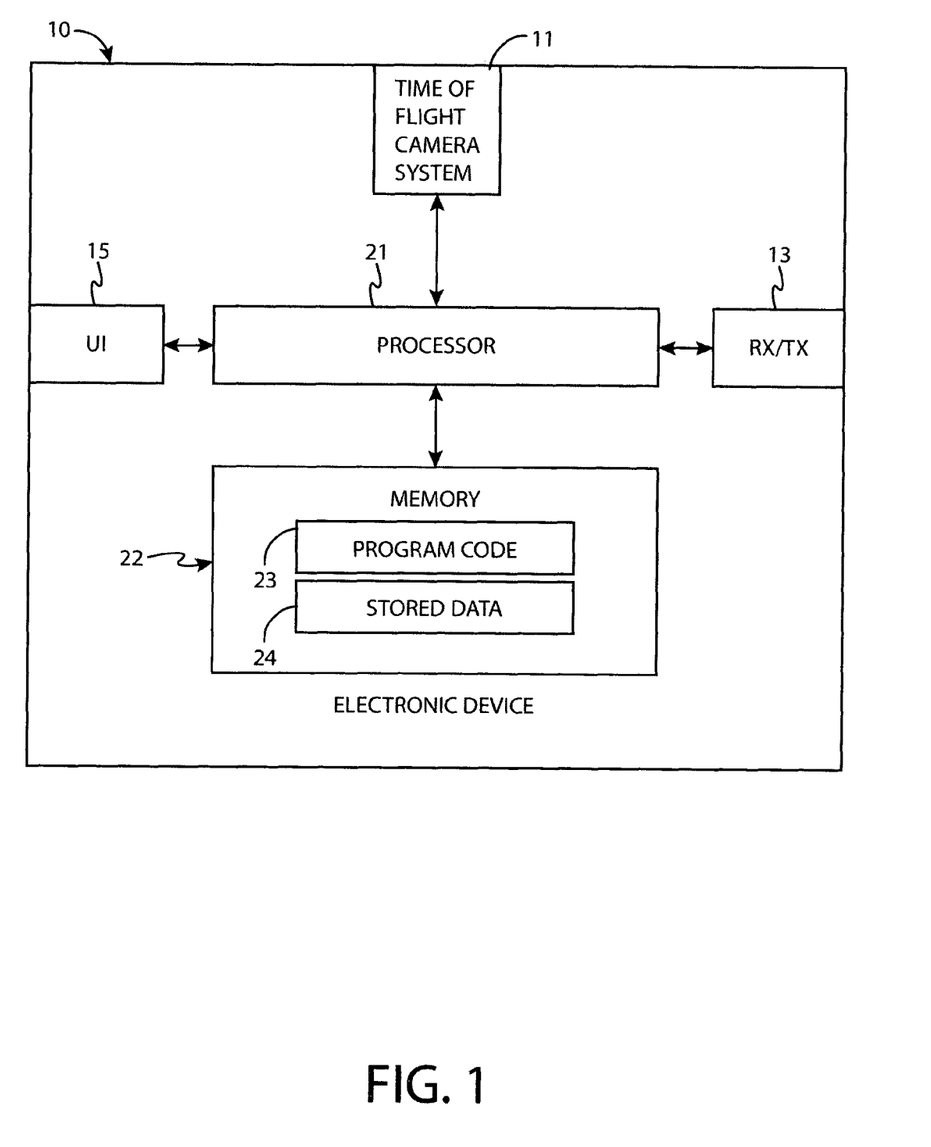
FIG. 1 shows schematically an apparatus suitable for employing some embodiments.

The apparatus 10 may for example be a mobile terminal or user equipment of a wireless communication system. In other embodiments the apparatus 10 may be an audio-video device such as video camera, audio recorder or audio player such as a mp3 recorder/player, a media recorder (also known as a mp4 recorder/player), or any computer suitable for the processing of audio signals.

In other embodiments the apparatus 10 may for example be a sub component of a larger computer system, whereby the apparatus 10 is arranged to operate with other electronic components or computer systems. In such embodiments the apparatus 10 may be arranged as an application specific integrated circuit (ASIC) with the functionality to control and interface to a ToF camera module and also process information from the ToF camera module.

In some embodiments the apparatus 10 may be arranged as an individual module which can be configured to be integrated into a generic computer such as a personal computer or a laptop.

The apparatus 10 in some embodiments may comprise a ToF camera system or module 11, which can be coupled to a processor 21. The processor 21 can be configured to execute various program codes. The implemented program codes in some embodiments can comprise code for processing the depth map image from the ToF camera module 11. In particular the implemented program codes can facilitate noise reduction in the processed distance image.

In some embodiments the apparatus further comprises a memory 22. In some embodiments the processor is coupled to memory 22. The memory can be any suitable storage means. In some embodiments the memory 22 comprises a program code section 23 for storing program codes implementable upon the processor 21. Furthermore in some embodiments the memory 22 can further comprise a stored data section 24 for storing data, for example data for which has been retrieved from the ToF camera module 11 for subsequent processing of the distance map image as will be described later. The implemented program code stored within the program code section 23, and the data stored within the stored data section 24 can be retrieved by the processor 21 whenever needed via the memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments comprise a touch screen or touch interface capable of both enabling information to be entered to the apparatus 10 and further displaying information to the user of the apparatus 10.

The display which is part of the user interface 15 may be used for displaying the depth map image as such and can be a liquid crystal display (LCD), or a light emitting diode (LED) display, or an organic LED (OLED) display, or a plasma screen. Furthermore, the user interface 15 may also comprise a pointing device, such as a mouse a trackball, cursor direction keys, or a motion sensor, for controlling a position of a small cursor image presented on the display and for issuing commands associated with graphical elements presented on the display.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The transceiver 13 can communicate with further devices by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

It is to be understood again that the structure of the apparatus 10 could be supplemented and varied in many ways.

Figure 2:
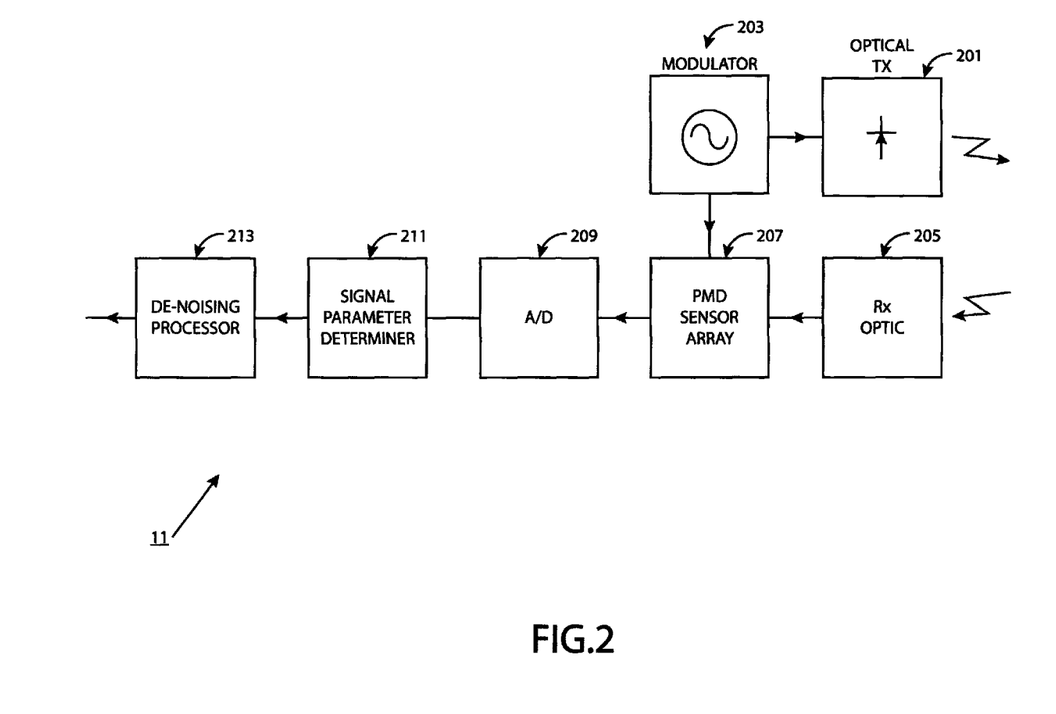
FIG. 2 shows schematically a ToF camera system suitable for employing some embodiments.
Figure 3:
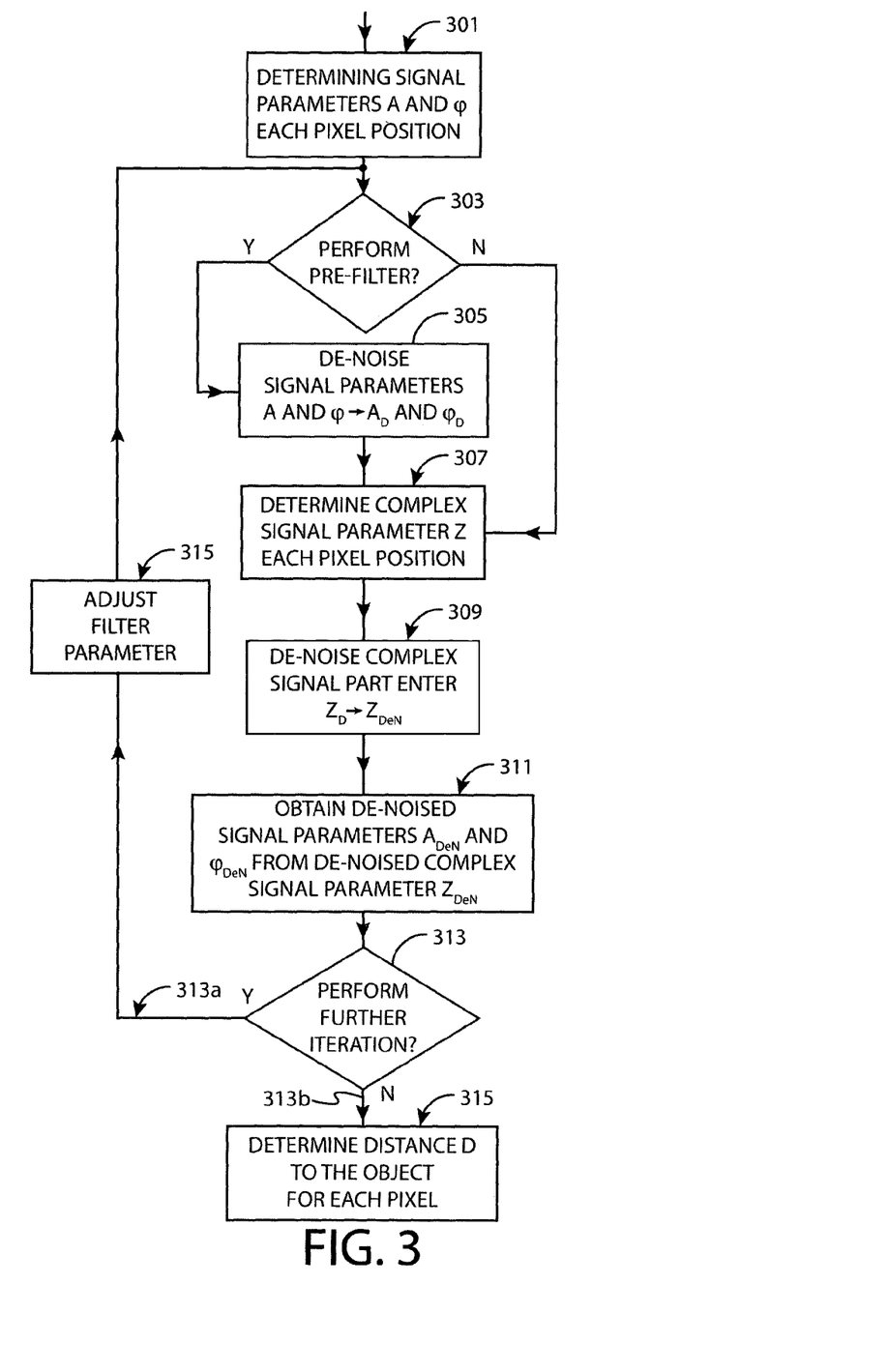
FIG. 3 shows schematically a flow diagram illustrating the operation of the ToF camera system of FIG. 2.
Figure 4:
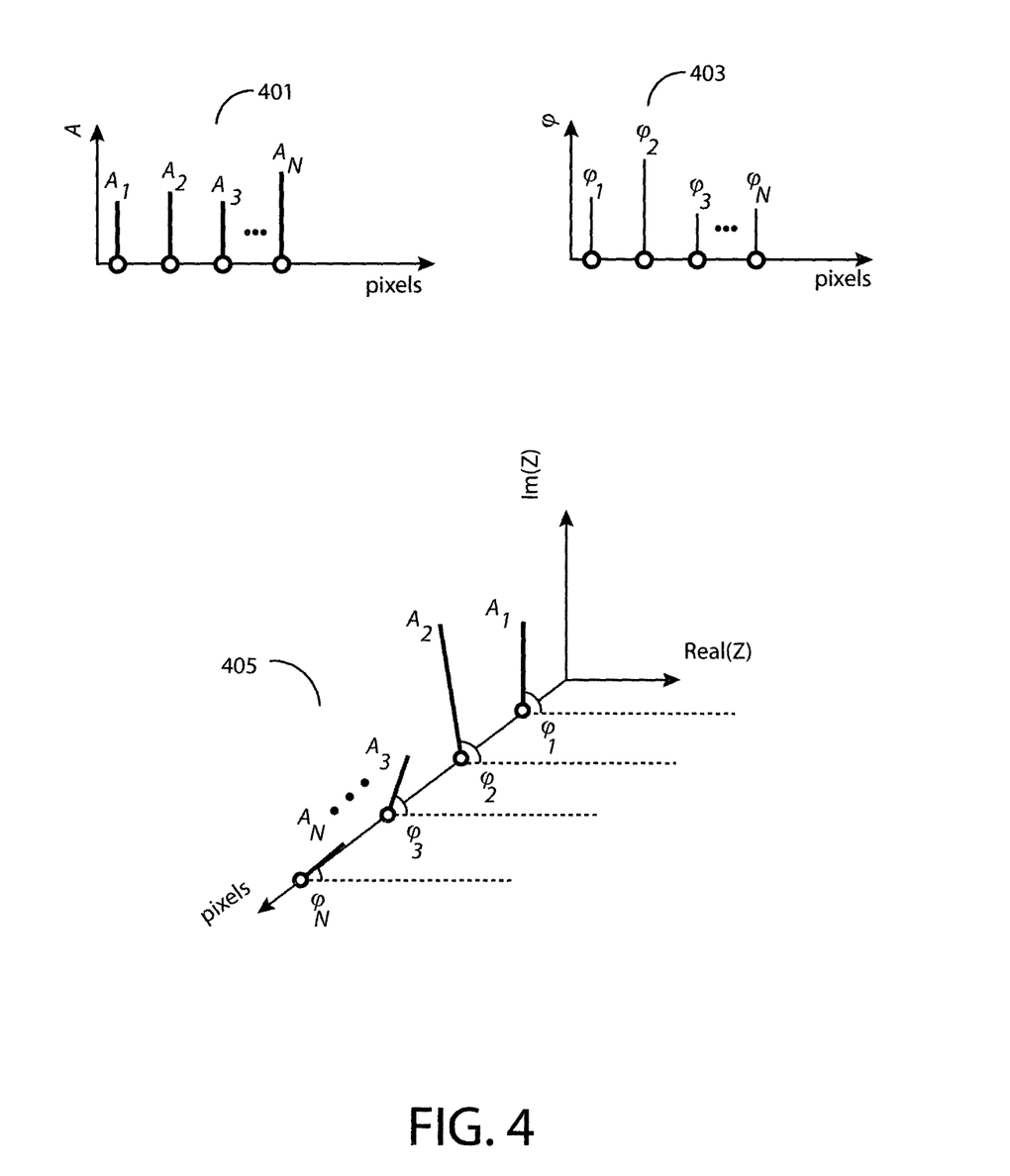
FIG. 4 shows schematically a complex parameter representation for signal parameters of the ToF camera system of FIG. 2.

It would be appreciated that the schematic structures described in FIGS. 2 and 4 and the flow diagram depicted in FIG. 3 represent only a part of the operation of the ToF camera system as exemplarily shown implemented in the apparatus shown in FIG. 1.

FIG. 2 shows schematically some components of the ToF camera module 11 according to some embodiments.

In some embodiments the ToF camera module 11 may be a Photonic Mixer Device (PMD) camera module. In such embodiments there may be an optical transmitter 201 which may be arranged to emit a cone of modulated light thereby illuminating a scene for distance detection. In embodiments the optical transmitter may be formed from an array of light emitting diodes (LEDs) configured to operate at wavelengths in the near infra-red (NIR) spectral region. Each LED may be married up with a respective optic in order to assist in the emission of light from the LED.

The light emitted from the optical transmitter may be amplitude modulated by an electrical reference signal from the modulator 203.

The reflected light signal may be received by a receiving optic 205 and channeled to the PMD sensor array 207. The PMD sensor array 207 may comprise an array of pixel sensor elements whereby each pixel sensor element may be in the form of a two light sensitive photo gates which are conductive and transparent to the received light. Each pixel sensor may further comprise readout diodes in order to enable an electrical signal to be read via a pixel readout circuitry.

A function of the PMD sensor array 207 can be to correlate the received optical signal for each pixel sensor with the electrical reference signal and to send the results of the correlation (via the readout circuitry of each pixel sensor) to an analogue to digital converter 209. In order to enable the correlation within each pixel sensor, the PMD sensor array 207 may also be arranged to receive the electrical reference signal from the oscillator 205. In embodiments the electrical reference signal used to perform the cross correlation functionality within the PMD sensor may be a phase variant of the original reference signal used to modulate the LED array at the optical transmitter 201.

It is to be appreciated that ToF systems utilise the principle of time of signal propagation in order to determine the range to an object. For PMD type ToF systems this principle may be manifested by using continuous wave modulation whereby the phase delay between sent and received light signals corresponds to the ToF and hence the distance to the object.

When the transmitted light signal is continuously amplitude modulated with a particular frequency the received reflected light signal will have the same frequency but may have a different phase and amplitude. The difference in phase, or phase delay, between the transmitted light signal and received light signal can be used to determine the distance to the object. This distance may be expressed by the following expression $$D \propto \frac{\varphi}{4\pi f} c_s \qquad (1)$$

where D is the distance to the object, φ is the determined phase delay between received and transmitted light signals, $c_s$ is the speed light and f is the modulation frequency. In embodiments the modulation frequency f may be of the order of 20 MHz.

The phase and the amplitude of the reflected received signal may be determined by cross correlating the reflected received signal with the original modulating signal (electrical reference signal) from the modulator 203. As mentioned above the cross correlation may be performed for each pixel sensor within the PMD sensor array 207.

In embodiments the cross correlation function may be performed at a number of pre-selected phase positions in order to enable the calculation of the phase difference (or delay) between the transmitted light signal and the received reflected light signal.

In a first group of embodiments the cross correlation function C(τ) between the received reflected light signal s(t) and the modulating signal g(t), may be calculated for four different phase delays, for example at $\tau_0=0°$, $\tau_1=90°$, $\tau_2=180°$, $\tau_3=270°$.

It is to be understood that other embodiments may adopt a general approach to determining the cross correlation function C(τ). The general approach may calculate the cross correlation function C(τ) for a number of different phase positions which is greater than four.

The cross correlation function C(τ) between the received reflected light signal s(t) and the modulating signal g(t) can be expressed as $$C(\tau) = s(t) \otimes g(t) \qquad (2)$$

In some embodiments the received reflected light signal s(t) can be expressed in the form of $$s(t) = 1 + A \cdot \cos(\omega t - \varphi), \qquad (3)$$

and the modulating signal can be expressed in the form of $$g(t) = \cos(\omega t). \qquad (4)$$

Where A denotes the modulation amplitude and φ denotes the phase of the received reflected signal.

In some embodiments the cross correlated signal for four different phase delays of $\tau_0=0°$, $\tau_1=90°$, $\tau_2=180°$, $\tau_3=270°$ can be simplified to $$C(\tau) = K + A \cos(\varphi + \tau) \qquad (5)$$

Where K is a modulation offset.

It is to be understood that the cross correlation function C(τ) can be determined at a number of different equally spaced phase positions τ by the PMD, that is $\tau = \tau_0, \tau_1, \ldots \tau_{N-1}$. In one group of embodiments the cross correlation function C(τ) can be calculated for the following phase positions $\tau_0=0°$, $\tau_1=90°$, $\tau_2=180°$, $\tau_3=270°$.

The output from the PMD device, in other words the cross correlation function C(τ) for each pixel sensor, may then be may be channeled to the Analogue to digital converter 209.

The Analogue to Digital (A/D) converter 209 may convert each cross correlation function signal from an analogue signal to a digital signal in order to enable further processing of the signal. It is to be appreciated that the (A/D) converter 209 may convert the cross correlation function signal for each phase position τ on a pixel wise basis.

The digital output from the analogue to digital converter 209 may then be passed to the signal parameter determiner 211.

The signal parameter determiner 211 can determine the parameters required to form the distance (or range) map of the illuminated scene on a pixel by pixel basis.

The parameters determined by the signal parameter determiner 211 may be the phase delay φ between the modulated signal g(t) and the reflected received signal s(t), the reflected received signal amplitude A, and the modulation offset K.

In embodiments the phase difference φ may be determined by using the following expression $$\varphi = \arg\left(\sum_{n=0}^{N-1} C_n e^{-\frac{2\pi n}{N}}\right) \qquad (6)$$

The amplitude A of the received reflected optical signal may be determined from $$A = \frac{2}{N}\left|\sum_{n=0}^{N-1} C_n e^{-\frac{2\pi n}{N}}\right| \qquad (7)$$

The modulation offset K may be determined from $$K = \frac{1}{N}\left(\sum_{n=0}^{N-1} C_n\right) \qquad (8)$$

It is to be appreciated in the above expressions that N signifies the number of phase positions over which the cross correlation function is determined, and $C_n$ represents the Cross correlation functions for each phase position $\tau_n$. In the first group of embodiments N is determined to be four in order to account for the different phase positions $\tau_0=0°$, $\tau_1=90°$, $\tau_2=180°$, $\tau_3=270°$. For this specific embodiment, the phase difference φ may be determined by using the following expression $$\varphi = \operatorname{atan}\left(\frac{C(\tau_3) - C(\tau_1)}{C(\tau_0) - C(\tau_2)}\right) \qquad (9)$$

The amplitude A of the received reflected optical signal may be determined from $$A = \frac{\sqrt{(C(\tau_3) - C(\tau_1))^2 + (C(\tau_0) - C(\tau_2))^2}}{2} \quad (10)$$

The modulation offset K may be determined as in equation (8)

In other words there may be in embodiments means for determining a phase difference between a light signal transmitted by a time of flight camera system and a reflected light signal received by a pixel light sensor of an array of pixels in an image sensor of the time of flight camera system, wherein the reflected light signal received by the pixel light sensor is reflected from an object illuminated by the transmitted light signal. Furthermore, embodiments may also comprise means for determining the amplitude of the reflected light signal received by the pixel light sensor.

It is to be further appreciated that the above parameters can be determined for each pixel in turn.

It is to be understood herein that the term signal parameter map may be used to denote collectively the parameters $\varphi$, A and K for all pixels of the map image.

The output of the signal parameter determiner 211, in other words the signal parameter map, may be connected to the input of the de-noising processor 213.

The de-noising processor 213 may be arranged to provide a filtering framework for de-noising the parameters of the signal parameter map, in other words the filtering framework provides for the de-noising of the parameters $\varphi$, A and K associated with each pixel.

With reference to FIG. 3 there is shown a flow diagram depicting at least in part some of the operations of the signal parameter determiner 211 and the de-noising processor 213 according to embodiments of the invention.

Accordingly there is depicted in FIG. 3 the processing step 301 of determining the signal parameters ($\varphi$, A and K) from the cross correlation function C($\tau$) for each pixel.

In embodiments de-noising of the signal parameters $\varphi$, A and K may be performed by adopting the technique of Non-Local spatial transform filtering. The essence of such an approach is to centre the pixel which is to be filtered within a window of neighbouring pixels. It is to be noted that the window of pixels may also be known in the art as a patch, and the patch containing the pixel to be filtered is known as the reference patch. The image is then scanned for other patches which closely resemble the patch containing the pixel to be filtered (in other words the reference patch). De-noising of the pixel may then be performed by determining the average pixel value over all pixel values within the image whose patches are deemed to be similar to the reference patch.

In embodiments the similarity between the reference patch and a further patch within the image may be quantified by utilizing a Euclidean based distance metric.

Non-Local spatial transform filtering may be performed on the signal parameters of each pixel on a pixel wise basis.

In a first group of embodiments a form of Non-Local spatial transform filtering known as Non-Local means filtering may be used to filter the signal parameters associated with each pixel.

Non-Local means filtering may be expressed by $$NL(x) = \frac{1}{N_n(x)} \int_\Omega \exp \frac{G_a * |u(x+.) - u(y+.)|^2(0)}{h^2} u(y) dy \quad (11)$$

where $N_n$ is a filter normaliser, $G_a$ is a Guassian Kernel, $\Omega$ denotes the range over which the image is searched, u denotes the values attached to the pixel at a position, x is the index of the pixel being filtered and is the centre pixel of the reference patch, y is the index of the pixel at the centre of a further patch (a patch which can be similar to the reference patch), h can be a filter parameter tuned in relation with noise variance, *.(0) can denote a centred convolution operator, and (+.) can denote the pixel indices around the centre pixel of a corresponding patch.

In a first group of embodiments the signal parameters $\varphi$ and A may each be individually filtered by using the above Non-Local means filter in order to produce de-noised signal parameters $\varphi_D$ and $A_D$. De-noising the parameters $\varphi$ and A may be performed for each pixel position in turn.

In other words the above Non-Local Means Filter may be applied to each signal parameter $\varphi$ and A in turn, where the variable u in the above equation can represent either the parameter $\varphi$ or A.

It is to be understood that the output from the Non-Local Means Filter NL(x) the de-noised parameters $\varphi_D$ and $A_D$ for a pixel position x. In other words the output from the Non-Local Means Filter NL(x) when the input variable u represents the phase difference signal parameter $\varphi$ at pixel position x is the de-noised phase delay signal parameter $\varphi_D$, and the output from the Non-Local Means Filter NL(x) when the input variable u represents the amplitude signal parameter A is the de-noised amplitude parameter $A_D$.

In some embodiments the step of individually processing the signal parameters $\varphi$ and A with the above Non-Local Means Filter to produce the individual de-noised parameters $\varphi_D$ and $A_D$ may be viewed as an optional pre-filtering step.

In other words the step of individually processing the signal parameters $\varphi$ and A may not be performed in some modes of operation. The decision to perform the above pre filtering step may be configured as a mode of operational of the de-noising processor 213.

Accordingly, FIG. 3 depicts the option of including the above pre filtering step into the mode of operation of the de-noising processor as the decision step 303.

The above pre filtering step can have the advantage of reducing effects of objects whose surfaces may have poor light reflectivity; or objects being illuminated by a light signal with a small angle of incidence; or the effect of multi path reflection in the returned light signal.

The aforementioned effects can result in a wrapping of the phase delay $\varphi$, whereby objects which have a range near the limit for the wavelength of the incident light may result in the phase delay of the reflected light being wrapped into the next waveform period. This wrapping effect may be happen when noise can have an influence on the value of the phase delay $\varphi$, when the phase delay $\varphi$ is near the wrapping boundary.

Pre-filtering by de noising the signal parameters A and $\varphi$ on an individual basis may have the effect of improving the similarity weights confidence for searched patches during the operation of subsequent de-noising filter stages.

In other embodiments pre filtering by the de-noising filter NL(x) may be performed on either just the amplitude signal parameter A or the phase delay signal parameter $\varphi$. This has the effect of reducing the computational complexity of the pre-filtering stage when compared to applying the de-noising filter individually to each signal parameter in turn.

In one variant of the above group of embodiments the de-noising filter NL(x) may be applied solely to the amplitude signal parameter A to give the de-noised amplitude signal parameter $A_D$. This can have the advantage in embodiments of improving the de-noising and edge preservation in the eventual distance map, however the effects due to structural artefacts such as those listed above may still be retained.

In another variant of the above group of embodiments the de-noising filter NL(x) may be applied solely to the phase delay signal parameter φ. This can have the advantage of suppressing artefacts such as those listed above however edge preservation may not be so pronounced in the eventual distance image.

In other words embodiments may comprise at least one of: means for de-noising a phase difference between a reflected light signal received by a pixel light sensor and a transmitted light signal, the de-noising of the phase difference being a pre-filtering step; and means for de-noising the amplitude of the reflected light signal received by the pixel light sensor, the de-noising of the phase difference also being a pre-filtering step.

The step of performing de-noising for each signal parameter φ, and A of each pixel is shown as processing step 305 in FIG. 3.

The phase difference φ and amplitude A of the received reflected light signal for each pixel may be combined into a single combined parameter.

In some embodiments the phase difference φ and amplitude A of the received reflected light signal for each pixel sensor may be combined into a single complex parameter Z. The complex signal parameter for each pixel may be expressed as $$Z = Ae^{j\varphi}, \quad (12)$$

where j is the imaginary unit. It is to be understood that in a mode of operation whereby the above pre filtering step 305 is deployed the complex signal parameter may be expressed as $$Z = A_D e^{j\varphi_D}. \quad (13)$$

With respect to FIG. 4 there is shown a graphical representation of a complex signal parameter map comprising four pixels.

With reference to FIG. 4, graph 401 depicts the amplitude A for the signal parameter map, and graph 403 depicts the phase difference φ for the same signal parameter map.

Again with reference to FIG. 4, graph 405 depicts the complex signal parameter Z for each pixel position for the signal parameter map. It can be seen from graph 405 that the complex signal parameter for each pixel position is vector bearing information relating to both the amplitude A and the phase difference φ of the received reflected signal.

In other words, embodiments may comprise means for combining the amplitude and phase difference for each pixel light sensor into a combined signal parameter for each pixel light sensor.

The step of determining the complex signal parameter for each pixel is shown as processing step 307 in FIG. 3.

In embodiments the de-noising filter may be applied to the complex signal Z for each pixel within the signal parameter map.

In a first group of embodiments the complex signal parameter Z for each pixel may be de-noised by applying the above Non-Local Means Filter. In other words, the above Non-local Means Filter may be modified in terms of the complex signal parameter Z. The Non-Local Means Filter may be expressed in terms of Z as $$NL_{cmplx}(x) = \frac{1}{N_n(x)} \int_\Omega \exp\frac{G_a * |Z(x+.) - Z(y+.)|(0)}{h^2} Z(y) dy \quad (14)$$

The output from the above Non-Local means filter $NL_{cmplx}(x)$ may be the de-noised complex signal parameter $Z_{DeN}$ at the pixel position x.

In other words embodiments may comprise means for de-noising the combined signal parameter for a pixel light sensor by filtering the combined parameter.

In some embodiments the combined signal parameter may be a complex signal parameter formed from combining the amplitude and phase difference for the pixel light sensor.

The step of de-noising the complex signal parameter for each pixel is shown as processing step 309 in FIG. 3.

The de-noised signal parameters $A_{DeN}$ and $\varphi_{DeN}$ for each pixel position x may be obtained from the de-noised complex signal parameter $Z_{DeN}$. In other words the de-noised amplitude $A_N$ and phase difference $\varphi_N$ can be obtained from $A_{DeN} = |Z_{DeN}|$ and $\varphi_{DeN} = \arg(Z_{DeN})$ respectively.

The step of obtaining the de-noised signal parameters $A_{DeN}$ and $\varphi_{DeN}$ for each pixel at position x from the de-noised complex signal parameter $Z_{DeN}$ is shown as processing step 311 in FIG. 3.

In some embodiments the processing steps 303 to 311 may be repeated for a number of iterations. In such embodiments the de-noised signal parameters $A_{DeN}$ and $\varphi_{DeN}$ for each pixel at position x may form the input to a further iteration of processing step 305, whereby the signal parameters $A_{DeN}$ and $\varphi_{DeN}$ may then be individually applied to the above Non-Local means filter NL(x).

Further de-noised signal parameters, where the signal parameters $A_{DeN}$ and $\varphi_{DeN}$ form the input to the Non-Local means filter NL(x), may be denoted as $A_{D2}$ and $\varphi_{D2}$ where "2" denotes a second or further iteration.

As before the output of the Non-Local means filter NL(x) filter, that is the individually de-noised amplitude and phase difference signal parameters $A_{D2}$ and $\varphi_{D2}$ for each phase position x, may then be combined into a single combined parameter. In a first group of embodiments the single combined parameter may be a single complex parameter $Z_2$.

The single complex parameter $Z_2$ may then form the input of the complex modified form of the Non-Local Means Filter $NL_{cmplx}(x)$.

The output of the complex modified form of the Non-Local Means Filter $NL_{cmplx}(x)$ may then be a further de-noised complex parameter $Z_{DeN2}$ for a pixel position x.

The de-noised amplitude $A_{DeN2}$ and phase difference $\varphi_{DeN2}$ can be obtained by further applying the equations $A_{DeN2} = |Z_{DeN2}|$ and $\varphi_{DeN2} = \arg(Z_{DeN2})$.

In other words, embodiments may comprise means for determining the de-noised phase difference for a pixel light sensor from the de-noised combined signal parameter.

The step of determining whether to iterate processing steps 303 to 311 is shown as decision step 313 in FIG. 3.

With reference to FIG. 3 if it is determined at processing step 313 that there should be further iterations of processing steps 303 to 311 then the return branch 313a is taken and the process loops back to commence a new iteration.

In embodiments, parameters of the Non-Local spatial transform filter may be adjusted for each processing loop. For instance, in the first group of embodiments the filter parameter h in the Non-local means filter can be adapted for each iteration of the processing loop.

The step of adjusting the Non-Local spatial transform filter parameter for further iterations of the processing loop is depicted in FIG. 3 as the processing step 315 in the return branch 313a.

It is to be appreciated in embodiments that the loop back branch 313a returns to the decision branch 303. Accordingly, the decision of whether to include the pre-filtering step 305 may be taken for each iteration of the processing loop.

If it is determined at processing step 313 that there is to be no further iterations then the decision branch 313b is taken and the de-nosing processor 211 may then determine the distance value D to the illuminated object for each pixel position.

In embodiments the distance value D may be determined by taking the de-noised phase difference signal parameter $\varphi_{DeN}$ as provided by processing step 311 and applying the value to equation (1) above.

The distance value D may be determined on a pixel wise basis in accordance with the phase delay for each pixel position within the map.

In other words embodiments may comprise means for calculating the distance range to an object for a pixel light sensor using the de-noised phase delay calculated for the pixel light sensor.

The step of determining the distance value D to the illuminated object for each pixel is shown as processing step 317 in FIG. 3.

Below is shown a possible pseudo code implementation to the above iterative approach for de-noising signal parameter data.

```
0. Initialize. Iteration counter N = 0.
   0.1. Capture data from PMD. Compute A, φ (Eq 9, 10)
1. IF pre-filtering?
   1.1. YES-Pre-filter optionally A, φ → A_[D] or φ_[D]
   1.2. NO-Skip step
2. Calculate Z_D from A_[D] or φ_[D] (Eq. 13)
3. Apply de-noising filter on Z_D (e.g. Eq. 14)
   3.1. SAVE output-Z_DeN
      3.2. Calculate A_DeN, φ_DeN from Z_DeN
4. IF Iterate?
   4.1. YES-N = N + 1. Adapt filter parameter-h.
      4.1.0. REPEAT Steps 1 ÷ 4
   4.2. NO-Calculate D from φ_DeN. (Eq. 1)
5. SAVE D. Finish
```

The output from the ToF camera system 11 may be the distance value D for each pixel within the PMD sensor array 207.

The distance value D for each pixel may then be passed to the processor 11 for further processing.

In some embodiments the distance values D for each pixel position may be displayed as a distance or depth map image in the UI 15.

It is to be appreciated in the above embodiments that the process of de-noising has been described in terms of the Non-Local Means Filter. However, other embodiments may use other forms of de-noising such as Gaussian smoothing, Bi(Multi)-lateral filtering, wavelet shrinkage, Sliding-local transform filtering (e.g. sliding-DCT) and Block-matching 3D collaborative transform-domain filtering BM3D.

Furthermore other embodiments may adopt other ToF camera systems such as radars, sonars and lidars.

Furthermore other embodiments may adopt different distance measuring systems, where the measurement data can be interpreted in complex domain such as structured-light based systems, systems based on structure-from-stereo, and termographic cameras.

Although the above examples describe embodiments of the invention operating within an apparatus 10, it would be appreciated that the invention as described above may be implemented as part of any computer or electronic apparatus supporting a ToF camera system.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Thus at least some embodiments may be an apparatus comprising at least one processor and at least one memory including computer program code the at least one memory and the computer program code configured to, with the at least one processor, cause the apparatus at least to perform: determining a phase difference between a light signal transmitted by a time of flight camera system and a reflected light signal received by at least one pixel sensor of an array of pixel sensors in an image sensor of the time of flight camera system, wherein the reflected light signal received by the at least one pixel sensor is reflected from an object illuminated by the transmitted light signal; determining an amplitude of the reflected light signal received by the at least one pixel sensor; combining the amplitude and phase difference for the at least one pixel sensor into a combined signal parameter for the at least one pixel sensor; and de-noising the combined signal parameter for the at least one pixel sensor by filtering the combined parameter for the at least one pixel sensor.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

Thus at least some embodiments of the encoder may be a non-transitory computer-readable storage medium having stored thereon computer readable, which, when executed by a computing apparatus, causes the computing apparatus to perform a method comprising: determining a phase difference between a light signal transmitted by a time of flight camera system and a reflected light signal received by at least one pixel sensor of an array of pixel sensors in an image sensor of the time of flight camera system, wherein the reflected light signal received by the at least one pixel sensor is reflected from an object illuminated by the transmitted light signal; determining an amplitude of the reflected light signal received by the at least one pixel sensor; combining the amplitude and phase difference for the at least one pixel sensor into a combined signal parameter for the at least one pixel sensor; and de-noising the combined signal parameter for the at least one pixel sensor by filtering the combined parameter for the at least one pixel sensor.

The memory may be of any type suitable to the local technical environment and may be implemented using any suitable data storage technology, such as semiconductor-based memory devices, magnetic memory devices and systems, optical memory devices and systems, fixed memory and removable memory, in other words a non-transitory computer-readable storage medium. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:
(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
    determining a phase difference between a light signal transmitted by a time of flight camera system and a reflected light signal received by at least one pixel sensor of an array of pixel sensors in an image sensor of the time of flight camera system, wherein the reflected light signal received by the at least one pixel sensor is reflected from an object illuminated by the transmitted light signal;
    determining an amplitude of the reflected light signal received by the at least one pixel sensor;
    de-noising at least one of the phase difference or the amplitude for the at least one pixel sensor by filtering the phase difference or the amplitude for the at least one pixel sensor;
    following de-noising of at least one of the phase difference or the amplitude, combining the amplitude and phase difference for the at least one pixel sensor into a combined signal parameter for the at least one pixel sensor; and
    de-noising the combined signal parameter for the at least one pixel sensor by filtering the combined parameter for the at least one pixel sensor to generate a de-noised combined signal parameter from which a distance map image that is less effected by noise is determinable by the time of flight camera system.

2. The method as claimed in claim 1, wherein the filtering further comprises:
    filtering with a non-local spatial transform filter.

3. The method as claimed in claim 2, wherein the non-local spatial transform filter is a non-local means filter.

4. The method as claimed in claim 1, further comprising calculating a distance range to the object from the de-noised combined signal parameter for the at least one pixel sensor by:
    determining the de-noised phase difference for the at least one pixel sensor from the de-noised combined signal parameter for the at least one pixel sensor; and
    calculating the distance range to the object for the at least one pixel sensor using the de-noised phase difference for the at least one pixel sensor.

5. The method as claimed in claim 1, wherein the combined signal parameter is a complex signal parameter formed from combining the amplitude and phase difference for the at least one pixel sensor.

6. The method as claimed in claim 1, wherein the image sensor of the time of flight camera system is based at least in part on a photonic mixer device.

7. An apparatus comprising at least one processor and at least one memory including computer code for one or more programs, the at least one memory and the computer code configured with the at least one processor to cause the apparatus at least to:
    determine a phase difference between a light signal transmitted by a time of flight camera system and a reflected light signal received by at least one pixel sensor of an array of pixel sensors in an image sensor of the time of flight camera system, wherein the reflected light signal received by the at least one pixel sensor is reflected from an object illuminated by the transmitted light signal;
    determine an amplitude of the reflected light signal received by the at least one pixel sensor;

de-noise at least one of the phase difference or the amplitude for the at least one pixel sensor by filtering the phase difference or the amplitude for the at least one pixel sensor;

following de-noising of at least one of the phase difference or the amplitude, combine the amplitude and phase difference for the at least one pixel sensor into a combined signal parameter for the at least one pixel sensor; and de-noise the combined signal parameter for the at least one pixel sensor by filtering the combined parameter for the at least one pixel sensor to generate a de-noised combined signal parameter from which a distance map image that is less effected by noise is determinable by the time of flight camera system.

8. The apparatus as claimed in claim 7, wherein filtering comprises filtering with a non-local spatial transform filter.

9. The apparatus as claimed in claim 8, wherein the non-local spatial transform filter is a non-local means filter.

10. The apparatus as claimed in claim 7, wherein the at least one memory and the computer code configured with the at least one processor is further configured to calculate a distance range to the object from the de-noised combined signal parameter for the at least one pixel sensor by being configured to:

determine the de-noised phase difference for the at least one pixel sensor from the de-noised combined signal parameter for the at least one pixel sensor, and calculate the distance range to the object for the at least one pixel sensor using the de-noised phase difference for the at least one pixel sensor.

11. The apparatus as claimed in claim 7, wherein the combined signal parameter is a complex signal parameter formed from combining the amplitude and phase difference for the at least one pixel sensor.

12. The apparatus as claimed in claim 7, wherein the image sensor of the time of flight camera system is based at least in part on a photonic mixer device.

13. A computer program product comprising at least one computer-readable storage medium, the computer-readable storage medium comprising a set of instructions, which, when executed by one or more processors, causes an apparatus to:

determine a phase difference between a light signal transmitted by a time of flight camera system and a reflected light signal received by at least one pixel sensor of an array of pixel sensors in an image sensor of the time of flight camera system, wherein the reflected light signal received by the at least one pixel sensor is reflected from an object illuminated by the transmitted light signal;

determine an amplitude of the reflected light signal received by the at least one pixel sensor;

de-noise at least one of the phase difference or the amplitude for the at least one pixel sensor by filtering the phase difference or the amplitude for the at least one pixel sensor;

following de-noising of at least one of the phase difference or the amplitude, combine the amplitude and phase difference for the at least one pixel sensor into a combined signal parameter for the at least one pixel sensor; and de-noise the combined signal parameter for the at least one pixel sensor by filtering the combined parameter for the at least one pixel sensor to generate a de-noised combined signal parameter from which a distance map image that is less effected by noise is determinable by the time of flight camera system.

14. The computer program product as claimed in claim 13, wherein the set of instructions when executed by the processor causes the apparatus to filter, further causes the apparatus to:

filter with a non-local spatial transform filter.

15. The computer program product as claimed in claim 14, wherein the non-local spatial transform filter is a non-local means filter.

16. The computer program product as claimed in claim 13, wherein the set of instructions when executed by the processor further causes the apparatus to calculate a distance range to the object from the de-noised combined signal parameter for the at least one pixel sensor by being caused to:

determine the de-noised phase difference for the at least one pixel sensor from the de-noised combined signal parameter for the at least one pixel sensor; and calculate the distance range to the object for the at least one pixel sensor using the de-noised phase difference for the at least one pixel sensor.

17. The computer program product as claimed in claim 13, wherein the combined signal parameter is a complex signal parameter formed from combining the amplitude and phase difference for the at least one pixel sensor.

18. The computer program product as claimed in claim 13, wherein the image sensor of the time of flight camera system is based at least in part on a photonic mixer device.

* * * * *